(12) United States Patent
Iwatsuka

(10) Patent No.: US 6,833,941 B2
(45) Date of Patent: Dec. 21, 2004

(54) MAGNETO-OPTIC OPTICAL DEVICE (75) Inventor: Shinji Iwatsuka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/631,854

(22) Filed: Aug. 1, 2003

(65) Prior Publication Data
US 2004/0027639 A1 Feb. 12, 2004

(30) Foreign Application Priority Data

Aug. 12, 2002 (JP) .......................... 2002-235184
Jun. 20, 2003 (JP) .......................... 2003-176654

(51) Int. Cl.$^7$ .............................................. G02B 27/28
(52) U.S. Cl. ....................................... 359/283; 359/280
(58) Field of Search ................................ 359/283, 280, 359/281, 284

(56) References Cited

U.S. PATENT DOCUMENTS

| 5,477,376 | A | 12/1995 | Iwatsuka et al. |
|---|---|---|---|
| 5,521,741 | A | 5/1996 | Umezawa et al. |
| 5,535,046 | A | 7/1996 | Shirai et al. |
| 5,812,304 | A | 9/1998 | Shirasaki et al. |
| 5,844,710 | A | 12/1998 | Fukushima |
| 5,867,300 | A | 2/1999 | Onaka et al. |
| 5,889,609 | A | 3/1999 | Fukushima |
| 5,973,821 | A | 10/1999 | Onaka et al. |
| 5,999,305 | A | 12/1999 | Fukushima |
| 6,018,411 | A | 1/2000 | Fukushima et al. |
| 6,018,412 | A | 1/2000 | Fukushima |
| 6,055,104 | A | 4/2000 | Cheng |
| 6,108,120 | A | 8/2000 | Kawai et al. |
| 6,198,567 | B1 | 3/2001 | Bergmann |
| 6,275,323 | B1 | 8/2001 | Fukushima |
| 6,278,547 | B1 | 8/2001 | Betin |
| 6,288,827 | B1 | 9/2001 | Kawai et al. |
| 6,333,806 | B1 | 12/2001 | Onaka et al. |
| 6,384,957 | B1 | 5/2002 | Ikeda et al. |
| 6,392,784 | B1 | 5/2002 | Ikeda et al. |
| 6,417,952 | B1 | 7/2002 | Kawai et al. |
| 6,507,422 | B1 | 1/2003 | Fukushima |

FOREIGN PATENT DOCUMENTS

| JP | A 06-51255 | 2/1994 |
|---|---|---|
| JP | A 07-104225 | 4/1995 |
| JP | A 07-306390 | 11/1995 |
| JP | A 09-61770 | 3/1997 |
| JP | A 09-236784 | 9/1997 |
| JP | A 09-288256 | 11/1997 |
| JP | A 10-90639 | 4/1998 |
| JP | A 10-161076 | 6/1998 |
| JP | A 11-119178 | 4/1999 |
| JP | A 11-212043 | 8/1999 |
| JP | A 11-249095 | 9/1999 |
| JP | A 2000-28967 | 1/2000 |
| JP | A 2001-142040 | 5/2001 |
| JP | A 2001-249313 | 9/2001 |
| JP | A 2002-258229 | 9/2002 |
| JP | A 2003-107420 | 4/2003 |

Primary Examiner—Georgia Epps
Assistant Examiner—Richard Hanig
(74) Attorney, Agent, or Firm—Oliff & Berridge PLC

(57) ABSTRACT

To provide a magneto-optic optical device, such as a variable optical attenuator, an optical modulator or an optical switch, that is small, has a low power consumption and has high speed. The above object is achieved by a magneto-optic optical device characterized by comprising at least one magneto-optical crystal, a magnetic field application mechanism for applying to the magneto-optical crystal a magnetic field component in a direction vertical to a light entrance/exit plane, and at least one electromagnet for changing a position where the magnetic field component applied to the magneto-optical crystal becomes zero.

13 Claims, 8 Drawing Sheets

PRIOR ART

FIG.13B

PRIOR ART

MAGNETO-OPTIC OPTICAL DEVICE

BACKGROUND OF THE INVENTION

1. Field of the Invention

The present invention relates to a magneto-optic optical device, such as a variable optical attenuator, an optical modulator or an optical switch, used for an optical communication system.

2. Description of the Related Art

As a variable optical attenuator, there is known a so-called magneto-optic variable optical attenuator which changes a Faraday rotation angle by the intensity of an applied magnetic field to control light attenuation. The magneto-optic variable optical attenuator has merits that since there is no mechanical movable part, its reliability is high and miniaturization is easy. The magneto-optic variable optical attenuator includes a magnetooptical crystal and an electromagnet for applying a magnetic field to the magnetooptical crystal. The quantity of a current flowing to the electromagnet is changed to control the intensity of the magnetic field applied to the magnetooptical crystal, so that the intensity of magnetization of the magnetooptical crystal is changed and the Faraday rotation angle can be controlled.

Figure 13A:
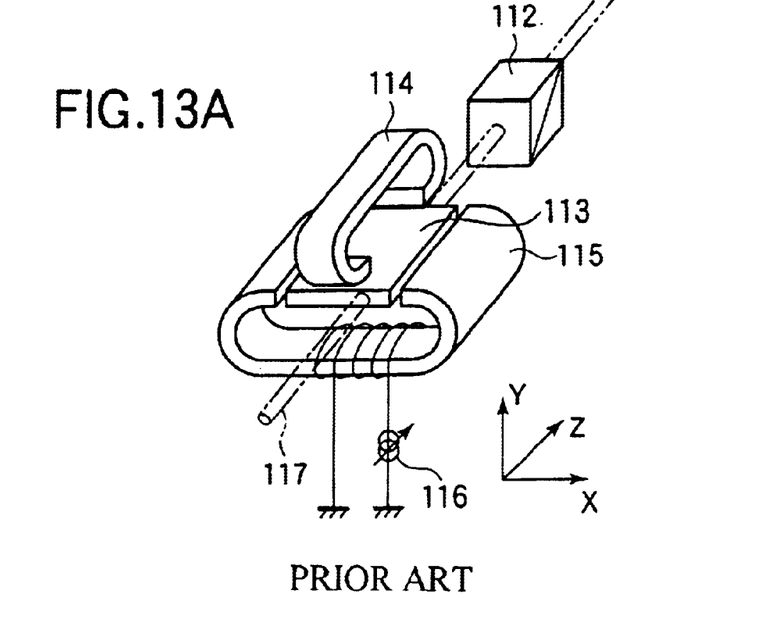
FIGS. 13A and 13B are views for explaining a rough structure and the operation principle of a variable optical attenuator as a conventional magneto-optic optical device.

A method of controlling a magnetic field applied to a magnetooptical crystal is disclosed in, for example, patent document 1 (Japanese Patent No. 2815509). This magnetic field control method will be described with reference to FIGS. 13A and 13B. FIG. 13A shows a variable optical attenuator, and the variable optical attenuator includes a Faraday rotator (magnetooptical crystal) 113 and a polarizer 112. Besides, the variable optical attenuator includes a permanent magnet 114 and an electromagnet 115 for applying magnetic fields to the Faraday rotator 113 in directions orthogonal to each other, and a variable current source 116 for feeding a driving current to the electromagnet 15.

The direction of the magnetic field applied to the Faraday rotator 113 by the permanent magnet 114 is parallel to the transmission direction of a light beam 117 in the Faraday rotator 113. The direction of the magnetic field applied to the Faraday rotator 113 by the electromagnet 115 is vertical to the application direction of the magnetic field of the permanent magnet 114 and the transmission direction of the light beam 117 in the Faraday rotator 113.

Figure 13B:
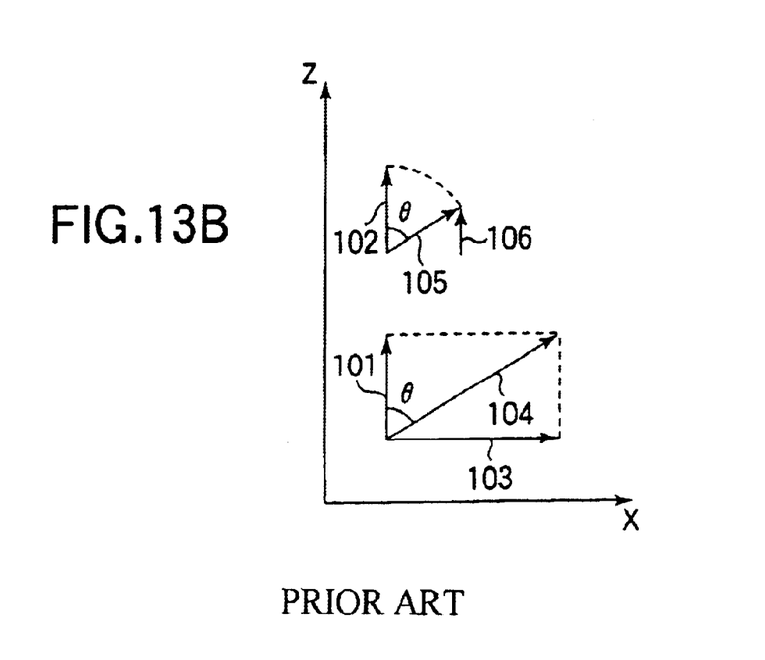

In FIG. 13B, each of arrows 102 and 105 is a vector indicating the direction of magnetization and its magnitude in the Faraday rotator 113, and each of arrows 101, 104 and 103 is a vector indicating the direction and magnitude of the application magnetic field applied from the outside. A Z direction in the drawing is the propagation direction of light in the Faraday rotator 113, and an X direction is orthogonal to the Z direction. The Faraday rotator 113 is put in a state of the saturation magnetization 102 by the vertical magnetic field 101 of the external permanent magnet 114. Next, when the horizontal magnetic field 103 of the electromagnet 115 is applied, the external magnetic field becomes the combined magnetic field 104, and the Faraday rotator 113 is put in a state of the magnetization 105. The magnitude of the magnetization 105 is equal to the magnitude of the saturation magnetization 102, and accordingly, the Faraday rotator 113 is in the state of the saturation magnetization.

As stated above, the vertical magnetic field is previously applied to the Faraday rotator 113 by the permanent magnet 114 to put the Faraday rotator 113 in the state of the saturation magnetization, and the horizontal magnetic field is further applied by the electromagnet 115 disposed in the in-plane direction of the Faraday rotator 113. Then, the direction of the magnetization of the Faraday rotator 113 is rotated by the combined magnetic field 104 of the two magnetic fields from the magnetization 102 to the magnetization 105 by an angle θ, and the magnitude of a magnetization component 106 in the Z direction is controlled. The Faraday rotation angle is changed in dependence on the magnitude of the magnetization component 106. This method has features that since the Faraday rotator 113 is always used in the saturation magnetization region, hysteresis does not occur, and the Faraday rotation angle can be changed with excellent reproducibility.

Incidentally, the following documents are cited for reference.

[Patent document 1]
  Japanese Patent No. 2815509
  Counterpart patent: U.S. Pat. No. 5,889,609
[Patent document 2]
  JP-A-7-1042251
  Counterpart patent: U.S. Pat. No. 5,535,046
[Patent Document 3]
  U.S. Pat. No. 5,477,376
[Patent Document 4]
  U.S. Pat. No. 6,198,567

However, in the magnetic field application method disclosed in the above-mentioned patent document 1, the magnetization is uniformly rotated in the state where the vertical direction magnetic field by the permanent magnet 114 is applied. It is necessary to enhance the in-plane direction magnetic field applied by the electromagnet 115, and the electromagnet 115 must be made large or a large current must be made to flow. Therefore, there is a problem that miniaturization and reduction in consumed electric power are difficult.

SUMMARY OF THE INVENTION

An object of the invention is to provide a magneto-optic optical device, such as a variable optical attenuator, an optical modulator or an optical switch, which is small, has a low power consumption, and has a high speed.

The above object is achieved by a magneto-optic optical device characterized by comprising at least one magnetooptical crystal, a magnetic field application mechanism for applying to the magnetooptical crystal a magnetic field component in a direction vertical to a light entrance/exit plane, and at least one electromagnet for changing a position where the magnetic field component applied to the magnetooptical crystal becomes 0.

The above magneto-optic optical device of the invention is characterized in that the magnetic field application mechanism includes at least one permanent magnet. Besides, a magnitude of the magnetic field component is monotonously changed in a specified direction in the light entrance/exit plane.

The above magneto-optic optical device of the invention is characterized in that the magnetooptical crystal includes a magnetic domain A constituted by a magnetization in a direction vertical to the light entrance/exit plane, and a magnetic domain B constituted by a magnetization in an opposite direction to the magnetization direction of the magnetic domain A.

The above magneto-optic optical device of the invention is characterized in that the magnetic field generated by the electromagnet is changed to form a state where only the magnetic domain A exists in a light transmission region of the magnetooptical crystal and a state where both the magnetic domain A and the magnetic domain B are contained, and a transmitted light intensity is continuously changed.

The above magneto-optic optical device of the invention is characterized in that a state where only the magnetic domain B exists is formed. Besides, a boundary between the magnetic domain A and the magnetic domain B is almost linear.

The above magneto-optic optical device of the invention is characterized in that a saturation Faraday rotation angle of the magnetooptical crystal is about 45°, and the magneto-optic optical device includes a polarizer disposed at one side of the magnetooptical crystal, and an analyzer disposed at the opposite side of the magnetooptical crystal.

Besides, the above magneto-optic optical device of the invention is characterized in that a saturation Faraday rotation angle of the magnetooptical crystal is about 90°, and the magneto-optic optical device includes a polarizer disposed at one side of the magnetooptical crystal, and an analyzer disposed at the opposite side of the magnetooptical crystal.

The above magneto-optic optical device of the invention is characterized in that a saturation Faraday rotation angle of the magnetooptical crystal is about 45°, and the magneto-optic optical device includes a polarizer disposed at one side of the magnetooptical crystal, and a reflecting film disposed at the opposite side of the magnetooptical crystal.

The magneto-optic optical device of the invention is characterized in that the magneto-optic optical device is a variable optical attenuator for variably controlling an attenuation by changing a current applied to the electromagnet.

The magneto-optic optical device of the invention is characterized in that the magneto-optic optical device is an optical modulator for modulating a transmitted light intensity by modulating a current applied to the electromagnet. Besides, the magneto-optic optical device is an optical switch.

According to the invention, the magnetization is not uniformly rotated, and the magnetic domain structure in the light transmission region is changed, and therefore, it is possible to realize the magneto-optic optical device, such as a variable optical attenuator, in which a small electromagnet can be used, or a current flowing to the electromagnet can be made a low current.

DESCRIPTION OF THE PREFERRED EMBODIMENTS

Figure 1A:
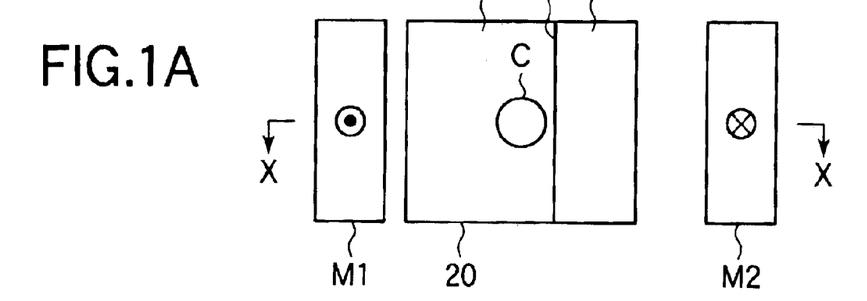
FIGS. 1A to 1C are views (No. 1) for explaining the operation principle of a variable optical attenuator as a magneto-optic optical device according to an embodiment of the invention.

A magneto-optic optical device according to an embodiment of the invention will be described with reference to FIGS. 1A to 12. First, the operation principle of the magneto-optic optical device according to the embodiment will be described with reference to FIGS. 1A to 3C. FIGS. 1A to 3C show states in which magnetic fields are applied to a Faraday rotator (magnetooptical crystal) 20 under different conditions. FIGS. 1A, 2A and 3A show states in which the Faraday rotator 20 is viewed in a direction vertical to a light entrance/exit plane. A region surrounded by a substantially center circle of the Faraday rotator 20 is a light transmission region C. For example, linearly polarized light traveling from the front of a paper plane to the back of the paper plane is incident on the light transmission region C of the Faraday rotator 20, its polarization direction is rotated by a predetermined angle, and it is radiated to the back of the paper plane. Permanent magnets M1 and M2 as a magnetic field application mechanism are disposed at both sides of the Faraday rotator 20. The two permanent magnets M1 and M2 have, for example, substantially the same magnetic force, and the respective magnetic poles are disposed opposite to each other (magnetizing directions are opposite to each other). For example, a magnetic flux in the inside of the permanent magnet M1 is directed from the back of the paper plane toward the front. Also a magnetic flux in the inside of the permanent magnet M2 is directed from the front of the paper plane toward the back. Besides, the permanent magnet M2 is disposed at a position more distant from the center of the light transmission region C of the Faraday rotator 20 than the permanent magnet M1.

Figure 1B:
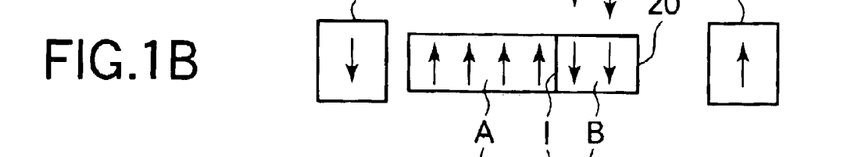
Figure 2A:
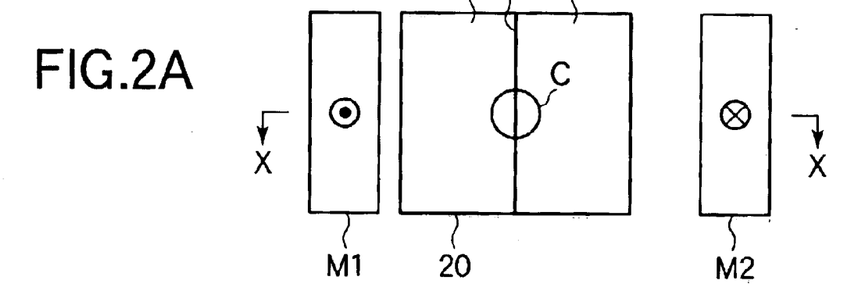
FIGS. 2A to 2C are views (No. 2) for explaining the operation principle of the variable optical attenuator as the magneto-optic optical device according to the embodiment of the invention.
Figure 2B:
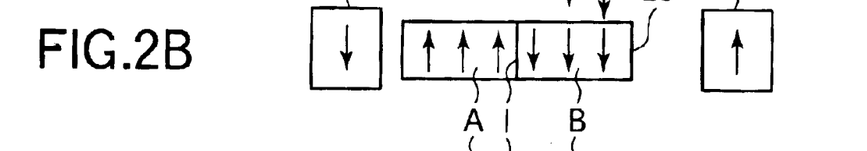
Figure 3A:
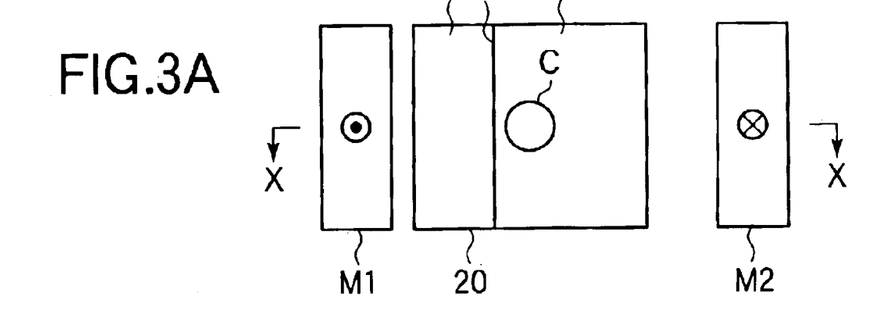
FIGS. 3A to 3C are views (No. 3) for explaining the operation principle of the variable optical attenuator as the magneto-optic optical device according to the embodiment of the invention.
Figures 3B, 3C:
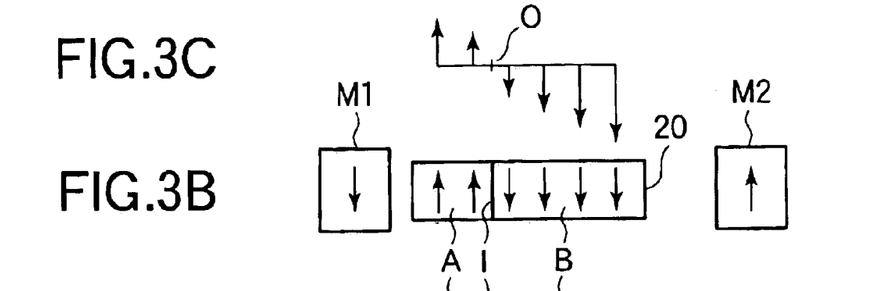

FIGS. 1B, 2B and 3B schematically show magnetic domain structures of the Faraday rotator 20 in a section taken along a line X—X shown in FIGS. 1A, 2A and 3A. A line X—X crosses the center of the light transmission region C. In FIGS. 1B, 2B and 3B, the magnetic flux in the inside of the permanent magnet M1 is indicated downward in the drawing, and the magnetic flux in the inside of the permanent magnet M2 is indicated upward in the drawing.

Figure 1C:
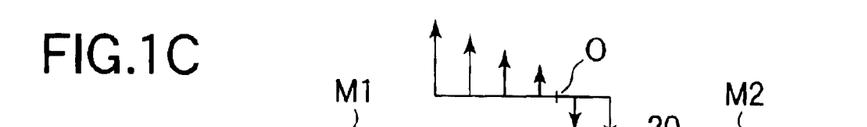
Figure 2C:
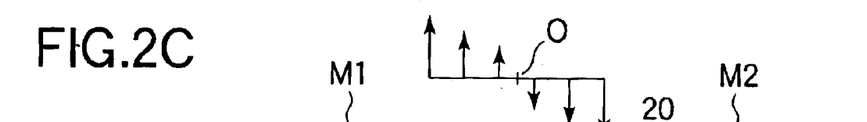

FIGS. 1C, 2C and 3C schematically show the direction and intensity of the magnetic field applied in the direction parallel to an optical axis (direction vertical to the light entrance/exit plane of the Faraday rotator 20) by use of the direction and length of an arrow. In the drawings, the horizontal direction corresponds to a position of the section of the Faraday rotator 20 in the horizontal direction, and the vertical direction indicates a direction parallel to the optic axis.

FIGS. 1A, 1B and 1C show the state in which the magnetic field is applied to the Faraday rotator 20 by only the permanent magnets M1 and M2. As shown in FIG. 1C, in the left portion of the Faraday rotator 20 close to the permanent magnet M1, the magnetic field is applied in the upward direction in the drawing (that is, toward the back of the paper plane in FIG. 1A). On the other hand, in the right close to the permanent magnet M2, the magnetic field is applied in the downward direction in the drawing (that is, toward the front of the paper plane in FIG. 1A). The magnitude of a magnetic field component applied to the Faraday rotator 20 is monotonously changed in a predetermined direction in the light entrance/exit plane. As indicated by the arrows in the Faraday rotator 20 of FIG. 1B, the direction of magnetization in the Faraday rotator 20 becomes equal to the direction of the magnetic field applied to the Faraday rotator 20 by the permanent magnet M1 and the permanent magnet M2. The permanent magnets M1 and M2 have substantially the same magnetic field intensity. However, the magnetic poles are opposite to each other, and the distance between the Faraday rotator 20 and the permanent magnet M1 is shorter than that between the Faraday rotator and the permanent magnet M2. Accordingly, the upward magnetic field as shown in FIG. 1C, that is, the magnetic field in the same direction as the traveling direction of light becomes dominant in the inside of the Faraday rotator 20. Accordingly, as shown in FIG. 1B, in the Faraday rotator 20, a region of a magnetic domain A having the upward (same direction as the traveling direction of light) magnetization becomes dominant over a region of a magnetic domain B having the downward (opposite direction to the traveling direction of light) magnetization. By this, as shown in FIG. 1C, at a position O where the magnetic field in the direction vertical to the light entrance/exit plane becomes 0, a boundary (hereinafter referred to as a magnetic domain wall I) between the magnetic domain A and the magnetic domain B is formed as shown in FIGS. 1A and 1B, and the light transmission region C is completely contained in the region of the magnetic domain A. Here, a Faraday rotation angle at the time when the light transmission region C is in the region of the magnetic domain A is made +θfs (saturation Faraday rotation angle).

Here, the permanent magnet M1 is made closer to the Faraday rotator 20 than the permanent magnet M2, so that the light transmission region C falls in the region of the magnetic domain A. However, for example, the magnetic force of the permanent magnet M1 may be made larger than that of the permanent magnet M2, and both are disposed to be substantially equally apart from the Faraday rotator 20, so that the light transmission region C falls in the region of the magnetic domain A. Alternatively, the permanent magnet M2 may not be used, and only the permanent magnet M1 is used, so that the light transmission region C falls in the region of the magnetic domain A.

Next, in FIGS. 2A, 2B and 2C, power is applied to a not-shown electromagnet to further apply a magnetic field opposite to the traveling direction of light in addition to the magnetic fields of the permanent magnets M1 and M2, so that the position O where the magnetic field in the vertical direction to the light entrance/exit plane becomes 0 is moved in the left direction of the drawing and is positioned substantially at the center of the Faraday rotator 20. By this, as shown in FIG. 2C, the inside of the Faraday rotator 20 is put into a state where the upward (same direction as the traveling direction of light) magnetic field in the drawing is applied to the left half, and the downward (opposite direction to the traveling direction of light) magnetic field is applied to the right half. Accordingly, as shown in FIG. 2B, the magnetic domain wall I is also moved in the left direction. In the Faraday rotator 20, the region of the magnetic domain A having the upward (same direction as the traveling direction of light) magnetization and the region of the magnetic domain B having the downward (opposite direction to the traveling direction of light) magnetization are equally formed on both sides of the boundary at the center. By this, as shown in FIG. 2A, the region of the magnetic domain A and the region of the magnetic domain B substantially equally exist in the light transmission region C, and since both the magnetic domains are evenly contained, the Faraday rotation angle θf becomes 0°.

Next, in FIGS. 3A, 3B and 3C, a large current is made to flow to the not-shown electromagnet to further apply the magnetic field in the opposite direction to the traveling direction of light, and as shown in FIG. 3C, the position O where the magnetic field in the vertical direction to the light entrance/exit plane becomes 0 is further moved in the left direction of the drawing. By this, as shown in FIG. 3C, the downward (opposite direction to the traveling direction of light) magnetic field in the drawing becomes dominant in the inside of the Faraday rotator 20. Accordingly, as shown in FIG. 3B, in the Faraday rotator 20, the region of the magnetic domain B having the downward (opposite direction to the traveling direction of light) magnetization becomes dominant over the region of the magnetic domain A having the upward (same direction as the traveling direction of light) magnetization. By this, as shown in FIG. 3A, the light transmission region C is completely contained in the region of the magnetic domain B. The Faraday rotation angle at the time when the light transmission region C is in the region of the magnetic domain B becomes −θfs.

Figure 4:
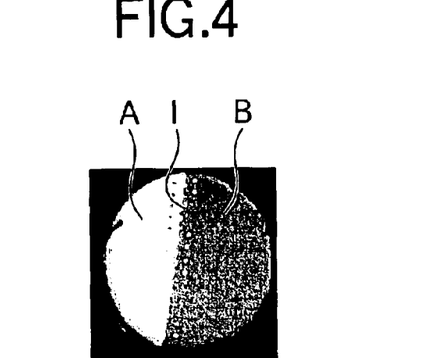
FIG. 4 is a view showing a state of a magnetic domain wall I between magnetic domains A and B occurring in a Faraday rotator 20 according to the embodiment of the invention.
Figure 5:
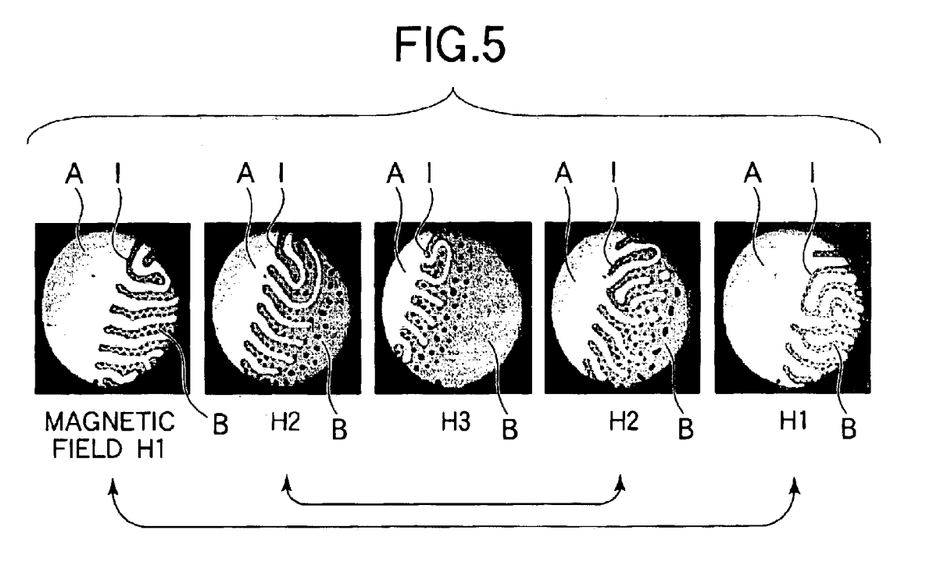
FIG. 5 is a view showing the state of the magnetic domain wall I between the magnetic domains A and B occurring in a case where a magnetic field gradient is small.

FIG. 4 shows a state of the magnetic domain wall I between the magnetic domains A and B generated in the Faraday rotator 20 using the above operation principle. FIG. 4 shows a part (in a circle) close to the magnetic domain wall I, and the magnetic domain wall I is formed to be linear. In the photograph shown in FIG. 4, in the magnetic domains A and B on both sides of the magnetic domain wall I, a region appears in which magnetization is partially inverted in the thickness direction. Even if such a region exists, if it does not become a factor to degrade reproducibility, its existence is allowed. As stated above, when the above operation principle is used, the intensity of the magnetic field applied to the Faraday rotator 20 is controlled so that the magnetic domain wall I becomes linear. In order to obtain such a linear magnetic domain structure, it is necessary to apply the magnetic field having a sufficiently large gradient. FIG. 5 shows parts (in circles) close to the magnetic domain wall I in the case where the magnetic field gradient is small, and as shown in the drawing, the magnetic domain wall I is formed to be nonlinear.

In the case where the magnetic domain wall I is nonlinear, as shown in FIG. 5 from the left to the right, for example, when the magnetic field (H1<H2 <H3) applied to the Faraday rotator 20 is gradually changed like H1, H2, H3, H2 and H1, even if a different magnetic field is returned to the original magnetic field, the magnetic domain structure is not returned to the original, and the reproducibility is not obtained. For example, although the left end and the right end of FIG. 5 show the application states of the same magnetic field H1, the magnetic domain structures of both are different from each other, and accordingly, the shapes of the magnetic domain walls I are nonlinear, and the shapes of both are different. Similarly, also in the application states of the same magnetic field H2 shown at the both sides of the state of application of the magnetic field H3 in the drawing, the reproducibility of the magnetic domain structure does not exist, the shapes of the magnetic domain walls I are nonlinear, and the shapes of both are different. Thus, in the operation principle shown in FIGS. 1A to 3C, in case the magnetic domain wall I of the shape as shown in FIG. 5 is used, the reproducibility of optical characteristics is lowered, and there arises a problem in practical use.

On the other hand, as shown in FIG. 4, in the case where the magnetic domain wall I of the boundary between the magnetic domains A and B is kept substantially linear, even if the applied magnetic field is changed and the magnetic domain wall I is moved, the shape of the magnetic domain wall I in the same magnetic field is hardly changed, and excellent reproducibility is obtained.

In order to keep the magnetic domain wall I substantially linear, the gradient of the magnetic field intensity in the vicinity of the position O shown in FIGS. 1C, 2C and 3C in which the magnetic field in the vertical direction to the light entrance/exit plane becomes 0 has only to be sufficiently large. Besides, by applying the uniform vertical direction magnetic field so that the magnetic domain wall I becomes linear in the light entrance/exit plane, the magnetic domain wall I can be moved with excellent reproducibility and stably. By this, it is possible to realize a magneto-optic optical device in which hysteresis of the magnetic domain structure as the problem of the related art does not occur and repetitive reproducibility is excellent. For example, the above-mentioned patent document 2 discloses a technique for disposing a permanent magnet as a method of removing magnetic hysteresis. However, there is no disclosure of control of the magnetic domain structure in the light transmission region C. In the structure of the patent document 2, although large hysteresis can be removed, it is difficult to sufficiently secure the reproducibility in the case where a current flowing to the electromagnet is changed.

The magnitude of the magnetic field required for keeping the magnetic domain wall I substantially linear depends on the properties of the magnetooptical crystal, such as vertical magnetic anisotropy, magnitude of saturation magnetization, or exchange energy. At least at both ends of the magnetooptical crystal, it is necessary to apply the magnetic fields having the magnitude larger than the saturation magnetic field and different directions. Experimentally, for example, the gradient of the magnetic field is gradually increased, and a condition under which the magnetic domain wall I becomes substantially linear can be found.

Figure 6A:
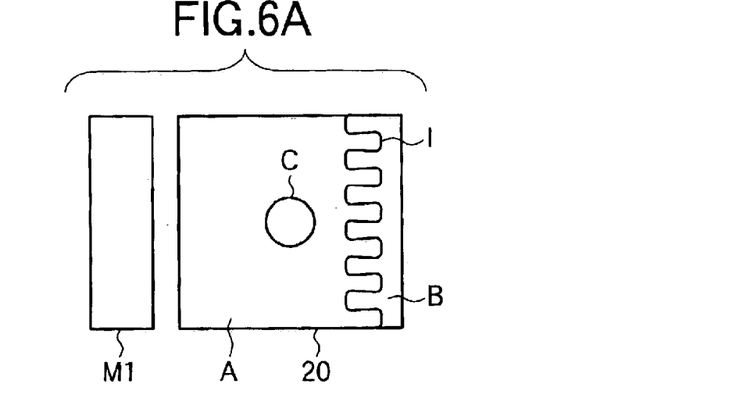
FIGS. 6A to 6C are views each showing a structure in which in the magneto-optic optical device shown in FIGS. 1A to 3A, a right permanent magnet M2 is omitted and only a left permanent magnet M1 is used.
Figure 6B:
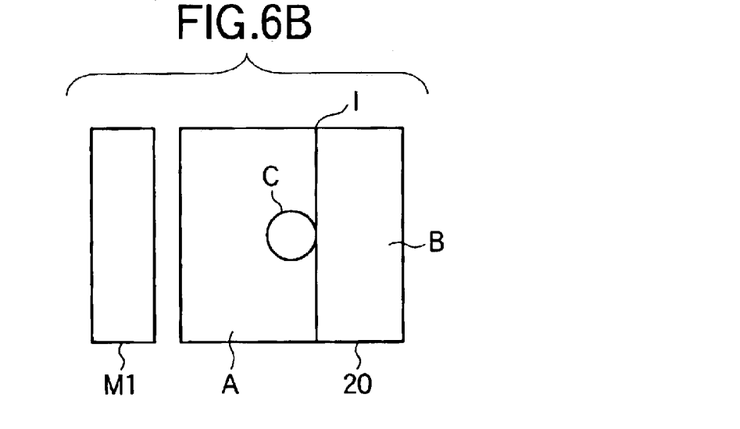
Figure 6C:
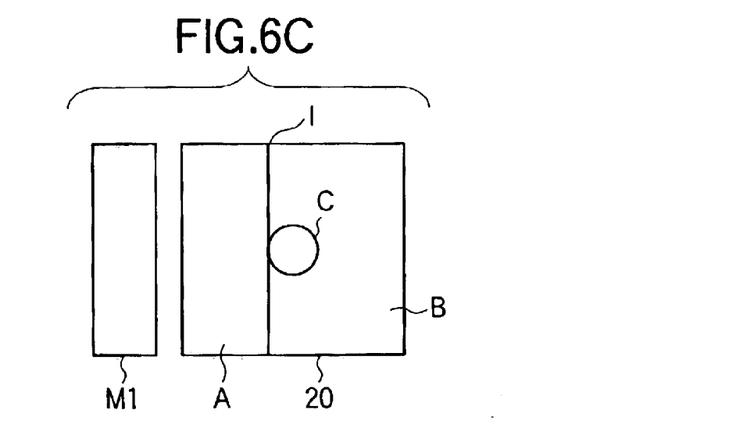

FIGS. 6A, 6B and 6C show structures in which in the magneto-optic optical device shown in FIGS. 1A to 3A, the right permanent magnet M2 is omitted and only the left permanent magnet M1 is used as the magnetic field application mechanism. As shown in FIG. 6A, in the case where there is no application of the magnetic field by the not-shown electromagnet, since the portion close to the right end of the Faraday rotator 20 in the drawing is distant from the permanent magnet M1, the applied magnetic field is small, and the gradient of the magnetic field is also small. In such a state, the magnetic domain wall I does not become linear. Besides, the position O where the magnetic field of the component vertical to the light entrance/exit plane becomes 0 does not exist.

When a substantially uniform opposite magnetic field is applied by the electromagnet, the position O where the magnetic field of the component vertical to the light entrance/exit plane becomes 0 comes to exist. Besides, the gradient of the magnetic field at the position O also becomes large, and by selecting a condition, as shown in FIGS. 6B and 6C, the magnetic domain wall I can be made linear. By causing the magnetic domain wall I to occur at the right of the light transmission region C, as shown in FIG. 6B, the inside of the light transmission region C can be made to contain only the magnetic domain A. Besides, when a predetermined magnetic field H2 larger than the applied magnetic field H1 is applied to cause the magnetic domain wall I to occur at the left of the light transmission region C, as shown in FIG. 6C, the inside of the light transmission region C can be made to contain only the magnetic domain B. Since such a linear magnetic domain wall I can be moved with excellent reproducibility, by changing the applied magnetic field from H1 to H2, the regions of the magnetic domain A and the magnetic domain B contained in the light transmission region C can be arbitrarily changed.

As shown in FIGS. 6B and 6C, when the position of the light transmission region C is set so that the linear magnetic domain wall I exists, it is understood that even if the magnetic domain wall I is not linear when the magnetic field of the electromagnet is 0 as shown in FIG. 6A, there is no practical problem. Although the nonlinear magnetic domain wall I is poor in reproducibility as shown in FIG. 5, if the region where the reproducibility becomes poor is made not to be contained in the light transmission region C, sufficient characteristics can be obtained.

As described above, according to the operation principle of this embodiment, by the movement of the magnetic domain wall I as the boundary region between the magnetic domain A and the magnetic domain B, the Faraday rotation angle can be changed in the range of +θfs to −θfs. For example, by disposing a polarizer before and after the Faraday rotator 20, a magneto-optic optical device such as a variable optical attenuator can be realized.

Figure 7:
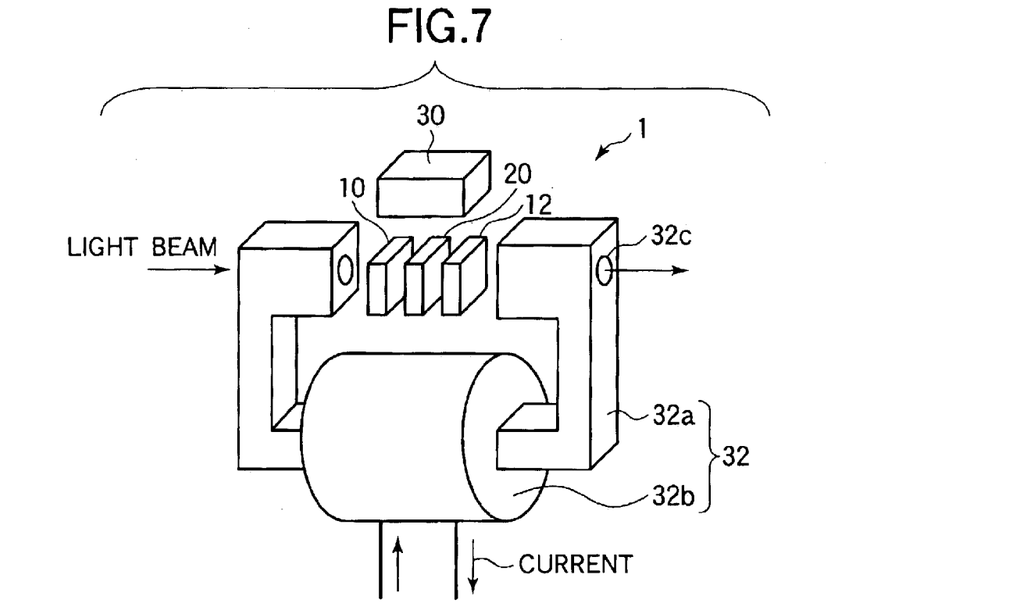
FIG. 7 is a view showing a rough structure of a variable optical attenuator as a magneto-optic optical device according to an embodiment of the invention.

Next, a rough structure of a magneto-optic optical device according to this embodiment using the operation principle will be described with reference to FIG. 7. FIG. 7 shows a rough structure of a variable optical attenuator as the magneto-optic optical device according to the embodiment. A variable optical attenuator 1 includes an optical component in which a first polarizer 10, a Faraday rotator (magnetooptical crystal) 20, and a second polarizer 12 are arranged in this order. As the first and the second polarizers 10 and 12, for example, a polarization glass, a wedge birefringence polarizer, or a birefringence plate can be used.

Besides, a permanent magnet (magnetic field application mechanism) 30 for applying a saturation magnetic field to the Faraday rotator 20 in a direction parallel to an optical axis is disposed. Further, an electromagnet 32 for applying to the Faraday rotator 20 a variable magnetic field in the direction parallel to the optical axis and opposite to the direction of the magnetic field of the permanent magnet 30 is disposed.

The electromagnet 32 includes a U-shaped yoke 32a and a coil 32b coiled on the yoke 32a. Clear apertures 32c for transmission of light are provided at both ends of the yoke 32a. The optical component in which the Faraday rotator 20 is placed between the first and the second polarizers 10 and 12 is positioned between both the ends of the yoke 32a. The incident light from the clear aperture 32c of the one end of the yoke 32a passes along the optical axis of the optical component, and is emitted from the clear aperture 32c of the other end of the yoke 32a. By applying power to the coil 32b, a closed magnetic path is formed in the yoke 32a and the optical component between both the ends of the yoke 32a, and a desired opposite magnetic field can be simultaneously applied to the Faraday rotator 20 to which the saturation magnetic field is previously applied in parallel to the optical axis.

The Faraday rotator 20 of the variable optical attenuator 1 according to the embodiment is formed by, for example, polishing a garnet single crystal film grown by an LPE (Liquid Phase Epitaxial) method. The garnet single crystal film has a vertical magnetic domain structure vertical to the film plane. In the case where a magnetic field smaller than the saturation magnetic field is applied, since the Faraday rotator 20 includes the magnetic domain structure, diffraction loss occurs.

In the variable optical attenuator 1 shown in FIG. 7, for example, the magnetic field of the same direction as the traveling direction of a light beam is applied vertically to the light entrance/exit plane of the Faraday rotator 20 by the permanent magnet 30. And in the state where a current does not flow to the electromagnet 32, the magnitude of the magnetic field component applied vertically to the light entrance/exit plane of the Faraday rotator 20 is monotonously decreased as the magnetic field application position becomes more distant from the permanent magnet 30. At this time, the light transmission region of the Faraday rotator 20 is, for example, completely included in the region of the magnetic domain A. The saturation Faraday rotation angle is +θfs, and by adjusting an angle between polarizing axes of the first polarizer 10 and the second polarizer (analyzer) 12 correspondingly to this, the light beam can be emitted without attenuation.

Next, by applying power to the electromagnet 32, the magnetic field opposite to the direction of the magnetic field of the permanent magnet 30 is applied. The boundary region where the magnetic field in the vertical direction to the light entrance/exit plane is 0 is formed substantially at the center of the light transmission region. By this, in the light transmission region, the region of the magnetic domain A and the region of the magnetic domain B equally come to exist on both sides of the magnetic domain wall I. Since both the magnetic domains are evenly contained, the Faraday rotation angle θf becomes 0°. As the Faraday rotation angle is changed from +θfs to 0°, the intensity of light absorbed by the second polarizer 12 is increased, so that a predetermined attenuation is realized.

Next, by further causing a large current to flow to the electromagnet 32 to further apply the magnetic field opposite to the direction of the magnetic field of the permanent magnet 30, the boundary region where the magnetic field in the vertical direction to the light entrance/exit plane becomes 0 is further moved to the side of the permanent magnet 30. By this, in the inside of the Faraday rotator 20, the magnetic domain wall I is moved, the region of the magnetic domain B becomes dominant over the region of the magnetic domain A, and the light transmission region is completely contained in the region of the magnetic domain B. The Faraday rotation angle at the time when the light transmission region is in the region of the magnetic domain B becomes −θfs. As the Faraday rotation angle is changed from 0° to −θfs, the intensity of light absorbed by the second polarizer 12 is further increased, and therefore, excellent attenuation is realized.

As described above, according to the variable optical attenuator 1 of the embodiment, by the movement of the magnetic domain wall I as the boundary region between the magnetic domain A and the magnetic domain B the Faraday rotation angle is changed in the range of from +θfs to −θfs, and the intensity of the light beam can be controlled. When the magnitude of θfs is set to about 45°, the Faraday rotation angle is changed from +45° to −45°. In this case, when the polarizers at both sides are disposed so that attenuation does not occur in the case of +45°, since the change amount of the rotation angle becomes 90° in the case of −45°, an extinction state occurs. And a maximum attenuation amount is obtained, and accordingly, an ideal variable optical attenuator can be realized in which the attenuation amount is large, and the attenuation amount is monotonously increased with respect to the applied current.

As stated above, the embodiment is not the magnetic field application system as disclosed in the above-mentioned patent document 1 in which the magnetization of the magnetooptical crystal is uniformly rotated, but is made the system in which the magnetic domain structure in the light transmission region is changed. Therefore, the Faraday rotation angle can be changed by the small electromagnet, and the small magneto-optic optical device can be realized. Besides, a response speed is normally limited by L (inductance) of an electromagnet, and when the electromagnet can be made small, L can be reduced, and the speed-up of the response speed can be realized.

Further, in the magnetic field application system disclosed in the above-mentioned patent document 1, although only the change from +θfs to greater than 0° can be obtained for the change of the Faraday rotation angle, according to the embodiment, the Faraday rotation angle can be changed in the range of from +θfs to −θfs, and a double change quantity can be obtained. Accordingly, since the thickness of the magnetooptical crystal used can be halved, cost reduction of a product can also be realized.

Next, a modified example of the magneto-optic optical device according to the embodiment will be described with reference to FIGS. 8 to 11. A variable optical attenuator 2 shown in FIG. 8 has a structure in which permanent magnets (magnetic field application mechanism) 30 and 31 for applying a saturation magnetic field to a Faraday rotator 20 in a direction parallel to an optical axis are disposed at both sides of the Faraday rotator 20. The two permanent magnets 30 and 31 have substantially the same magnetic force, and magnetic poles are disposed opposite to each other. Besides, the permanent magnet 31 is disposed at a position more distant from the center of the light transmission region of the Faraday rotator 20 than the permanent magnet 30.

Figure 8:
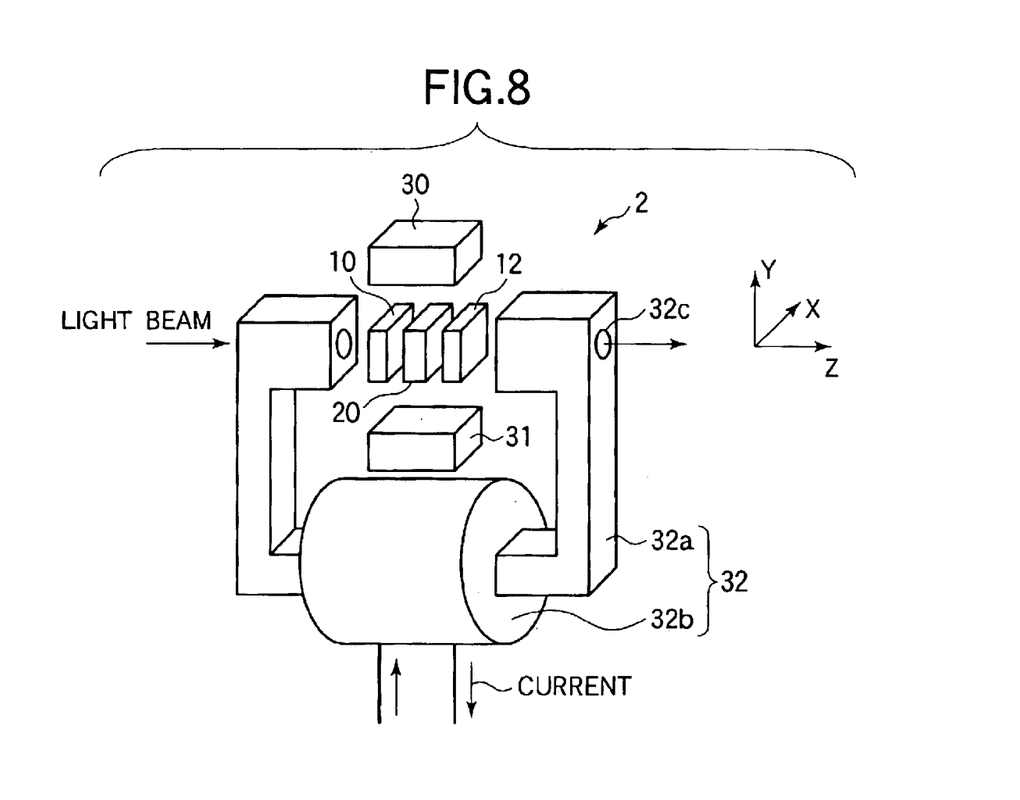
FIG. 8 is a view showing a rough structure of a variable optical attenuator as another magneto-optic optical device according to an embodiment of the invention.

Faraday rotator 20 of the variable optical attenuator 2 of the embodiment is also formed by, for example, polishing a garnet single crystal film grown by the LPE method and having a vertical magnetic domain structure vertical to a film surface.

In the variable optical attenuator 2 shown in FIG. 8, in the state where the magnetic field is applied to the Faraday rotator 20 by only the permanent magnets 30 and 31, a magnetic domain A occurring in a region where the magnetic field of the permanent magnet 30 is dominant has a wider region than a magnetic domain B occurring in a region where the magnetic field of the permanent magnet 31 is dominant. The light transmission region is completely contained in the region of the magnetic domain A. The saturation Faraday rotation angle is +θfs, and here, +θfs is set to about +90°. When an angle between polarizing axes of the first polarizer 10 and the second polarizer (analyzer) 12 is adjusted to 90°, a light beam can be emitted without attenuation.

Next, power is applied to the electromagnet 32 to apply a magnetic field having the opposite direction to the direction of the magnetic field of the permanent magnet 30 and the same direction as the direction of the magnetic field of the permanent magnet 31. A boundary region where the magnetic field in the vertical direction to the light entrance/exit plane is 0 is formed substantially at the center of the light transmission region. By this, in the light transmission region, the region of the magnetic domain A and the region of the magnetic domain B substantially equally exist on both sides of the magnetic domain wall I. The direction of magnetization of the magnetic domain B is opposite to the direction of the magnetization of the magnetic domain A, and the saturation Faraday rotation angle in the magnetic domain B is −θfs (about −90°). By this, the phase of the light passing through the magnetic domain A is shifted by a half wavelength from the light passing through the magnetic domain B. Thus, when the variable optical attenuator 2 is disposed between collimator optical systems, two lights concentrated on the end of a single mode optical fiber (not shown) for output cancel out and do not go straight. In the case where the region of the magnetic domain A and the region of the magnetic domain B equally exist in the light transmission region, the two lights concentrated on the end of the single mode optical fiber for output are not coupled at all, and the maximum attenuation amount is obtained.

Figure 9:
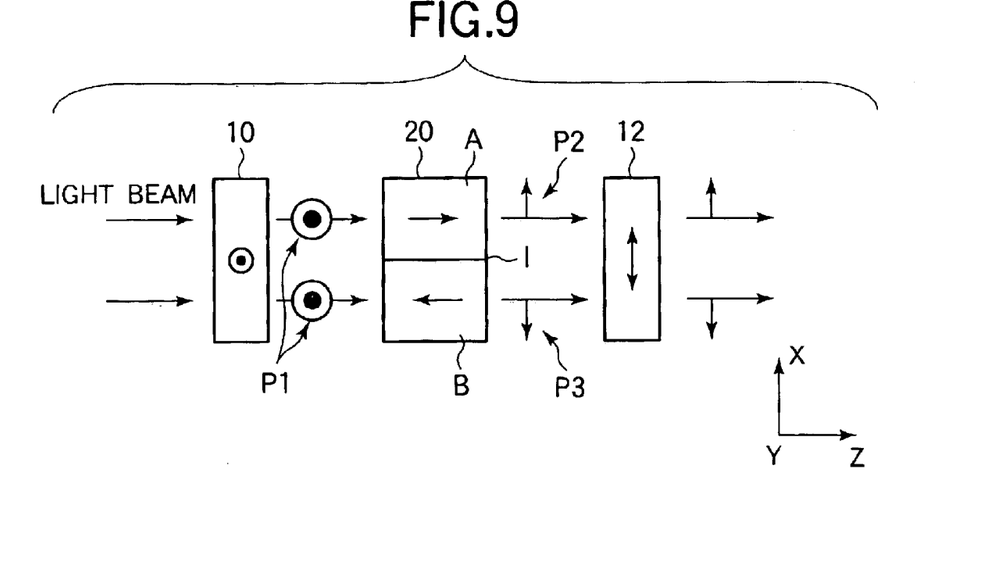
FIG. 9 is a view showing a state in which in an x-y-z orthogonal coordinate system shown in FIG. 8, a Faraday rotator 20 and first and second polarizers 10 and 12 are viewed from a+y direction to a−y direction.
Figure 10A:
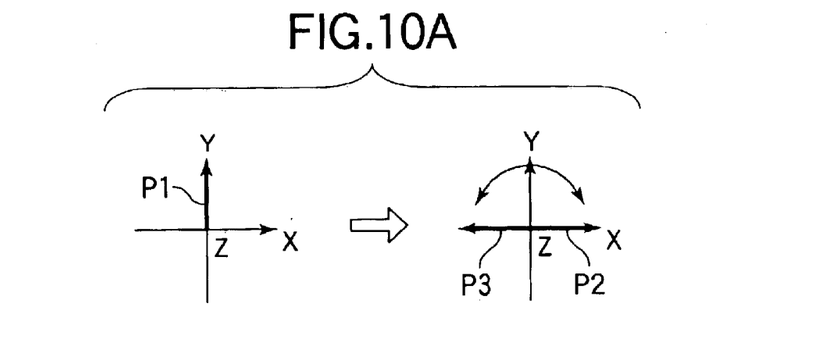
FIGS. 10A and 10B are views each showing a state in which in the x-y-z orthogonal coordinate system shown in FIG. 8, an optical path is viewed from a+z direction to a−z direction.
Figure 10B:
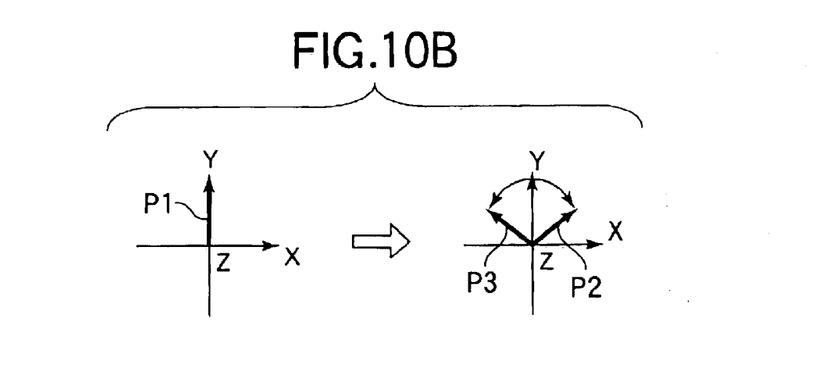

In the variable optical attenuator 2 shown in FIG. 8, that the maximum attenuation amount is obtained when the magnetic domain wall I is formed substantially at the center of the light transmission region of the Faraday rotator 20 will be described with reference to FIGS. 9, 10A and 10B. FIG. 9 shows a state in which in an x-y-z orthogonal coordinate system shown in FIG. 8, the Faraday rotator 20 and the first and the second polarizers 10 and 12 are viewed in a direction from a+y direction to a−y direction. FIGS. 10A and 10B show states in which in the x-y-z orthogonal coordinate system shown in FIG. 8, the optical path is viewed in a direction from a+z direction to a−z direction. FIG. 10A shows the polarization state of light in the case where the Faraday rotation angle θfs is 90°, and FIG. 10B shows the polarization state of light in the case where the Faraday rotation angle is deviated from 90°. Since the Faraday rotation angle is generally changed by a wavelength and temperature, FIG. 10B corresponds to a case where the wavelength or the temperature is deviated from the center wavelength or the center temperature.

As shown in FIG. 9, the polarizing axis (light transmission axis) of the first polarizer 10 is set to be parallel to the y axis, and the polarizing axis of the second polarizer 12 is set to be parallel to the x axis orthogonal to the polarizing axis of the first polarizer 10. The light beam travels in the +z direction. As shown in FIGS. 9 and 10A, the incident light from the clear aperture 32c of one end of the yoke 32a is incident on the first polarizer 10 and is incident on the light transmission region of the Faraday rotator 20 as linearly polarized light P1 whose polarization direction is parallel to the y axis. The linear magnetic domain wall I is formed substantially at the center of the light transmission region of the Faraday rotator 20, and the magnetic domains A and B are formed at both sides thereof. The light P1 is equally incident on the magnetic domains A and B, and the polarization direction of the light transmitted through the magnetic domain A is rotated by the Faraday rotation angle +θfs (=+90°) and becomes linear polarization light P2 parallel to the x axis. On the other hand, the polarization direction of the light transmitted through the magnetic domain B is rotated by the Faraday rotation angle −θfs (=−90°) and becomes linearly polarized light P3 parallel to the x axis. Thus, as shown in FIGS. 9 and 10A, the light P2 and the light P3 are emitted from the Faraday rotator 20, while they are coincident to each other in the amplitude and the polarization direction, and the phases are deviated from each other by 180°. Accordingly, both the lights P2 and P3 are transmitted through the second polarizer 12, are concentrated on the end of a single mode optical fiber (not shown) for output, and cancel out.

FIG. 10B shows the case where the Faraday rotation angle θfs is not 90°. In this case, the light P1 incident on the light transmission region of the Faraday rotator 20 is equally incident on the magnetic domains A and B. The light transmitted through the magnetic domain A becomes linearly polarized light P2 whose polarization direction is rotated by, for example, the Faraday rotation angle +θfs (≠+90°). The light transmitted through the magnetic domain B becomes linearly polarized light P3 whose polarization direction is rotated by the Faraday rotation angle −θfs (≠−90°). Then, in the light P2 and the light P3, their y-direction components are blocked by the second polarizer 12, and only their x-direction components are transmitted through the second polarizer 12. Although the light P2 and the light P3 transmitted through the second polarizer 12 have the same amplitude, since the phases are deviated from each other by 180°, they are concentrated on the end of the single mode optical fiber (not shown) for output and cancel out.

As stated above, the variable optical attenuator 2 shown in FIG. 8 is different from the conventional variable optical attenuator using the change of the Faraday rotation angle, and is characterized by using the diffraction effect of light, not the change of the Faraday rotation angle. As a conventional variable optical attenuator using diffraction, a structure disclosed in the patent document 3 or the patent document 4 and not using a polarizer is known. By adopting the structure using the polarizers as in the variable optical attenuator 2 shown in FIG. 8, it becomes possible to obtain excellent characteristics of very low wavelength dependency and temperature dependency as compared with the conventional variable optical attenuator.

Figure 11:
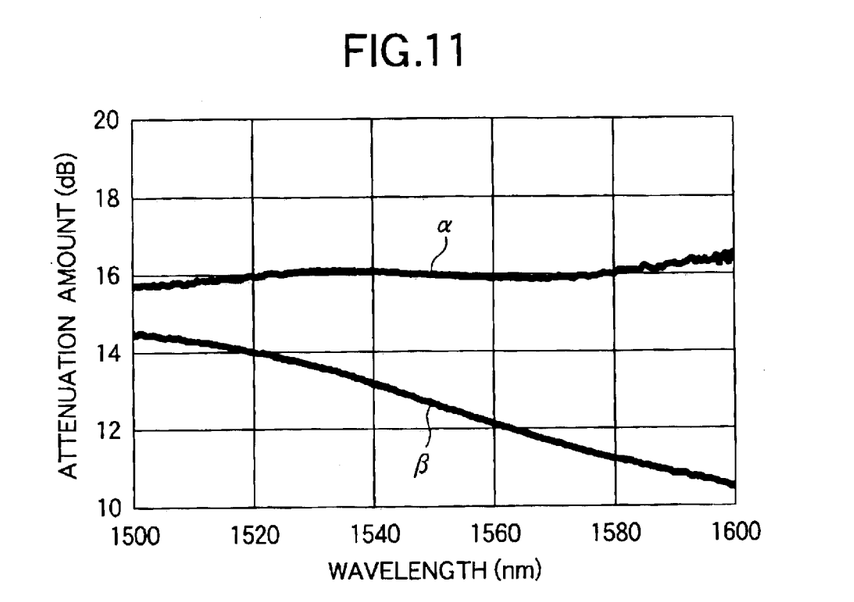
FIG. 11 is a view showing measurement results of wavelength dependency of the variable optical attenuator shown in FIG. 8 and a conventional variable optical attenuator in which a polarizer is not disposed.

FIG. 11 shows measurement results of wavelength dependency of the variable optical attenuator 2 shown in FIG. 8 and the conventional variable optical attenuator in which a polarizer is not disposed. The horizontal axis indicates a wavelength (nm) of incident light, and the vertical axis indicates an attenuation amount (dB). A curved line α in the drawing indicates the characteristic of the variable optical attenuator 2 shown in FIG. 8, and a curved line β indicates the characteristic of the conventional variable optical attenuator. In general, the Faraday rotation angle obtained by the Faraday rotator is changed in dependence on the wavelength of light and the temperature of the rotator. Then, by the change of the Faraday rotation angle, the optical characteristics of the Faraday rotator are also changed. Accordingly, in the conventional variable optical attenuator using the change of the Faraday rotation angle, the wavelength dependency and the temperature dependency can not be neglected in practical use.

On the other hand, the variable optical attenuator 2 shown in FIG. 8 has the operation principle in which the relative angle between the polarizing axes of the first and the second polarizers 10 and 12 is disposed to be 90°, and the phase difference of wavelengths of the lights transmitted through the two magnetic domains A and B is used, while the angle change of the Faraday rotation angle is not used. Accordingly, the wavelength dependency and the temperature dependency can be made very low.

As shown in FIG. 11, in the variable optical attenuator 2 indicated by the curved line α, the attenuation amount is almost uniform in the wide wavelength range of 1500 to 1600 nm. On the other hand, in the case of the conventional variable optical attenuator indicated by the curved line β in which a polarizer is not disposed, very large wavelength dependency is shown.

Figure 12:
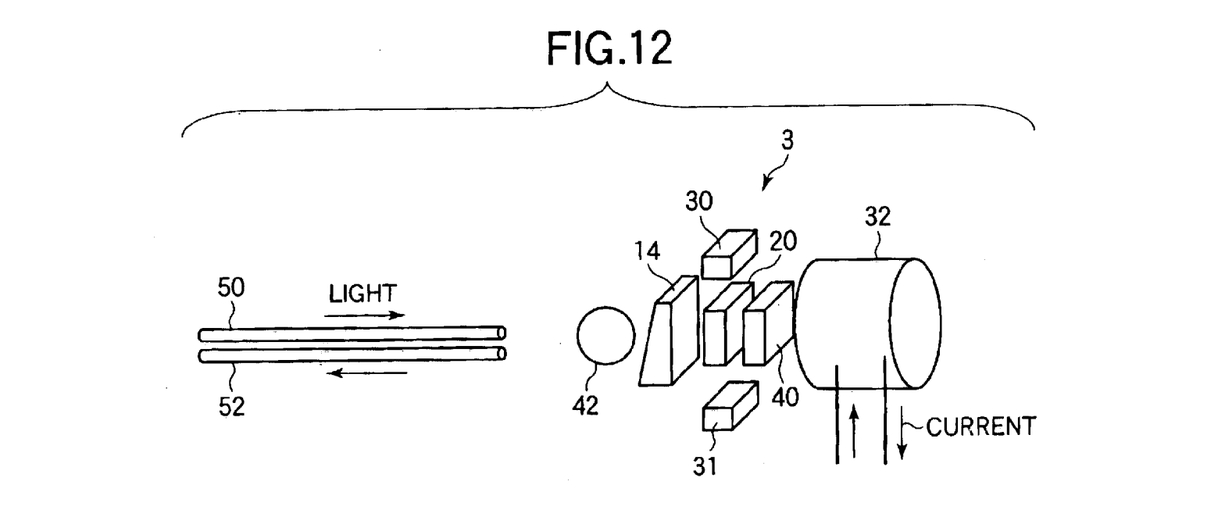
FIG. 12 is a view showing a rough structure of a variable optical attenuator as a still another magneto-optic optical device according to an embodiment of the invention.

Next, another modified example of the magneto-optic optical device according to the embodiment will be described with reference to FIG. 12. A variable optical attenuator 3 shown in FIG. 12 is characterized in that as compared with the variable optical attenuators 1 and 2 shown in FIGS. 7 and 8, a Faraday rotator 20 is placed between a polarizer 14 and a reflecting mirror 40. That is, the variable optical attenuator includes an optical component in which the polarizer 14, the Faraday rotator (magnetooptical crystal) 20, and the reflecting mirror 40 are arranged in this order. The reflecting mirror 40 is formed by, for example, evaporating a metal thin film of aluminum or the like on a glass substrate. Besides, instead of the reflecting mirror 40, a metal thin film or the like may be naturally evaporated as a reflecting film on the surface of the Faraday rotator 20 at the opposite side to the polarizer 14. As the polarizer 14, a birefringence wedge plate can be used. Further, a lens 42 is disposed between the optical component and an end of a single mode optical fiber 50 for input and an end of a single mode optical fiber 52 for output.

Besides, permanent magnets (magnetic field application mechanism) 30 and 31 for applying a saturation magnetic field to the Faraday rotator 20 in a direction parallel to an optical axis are disposed at both sides of the Faraday rotator 20. The two permanent magnets 30 and 31 have, for example, substantially the same magnetic force, and magnetic poles are disposed in opposite directions. Besides, the permanent magnet 31 is disposed at a position more distant from the center of the light transmission region of the Faraday rotator 20 than the permanent magnet 30. Further, an electromagnet 32 for applying a variable magnetic field to the Faraday rotator 20 in a direction parallel to the optical axis, in an opposite direction to the direction of the magnetic field by the permanent magnet 30 and in the same direction as the magnetic field by the permanent magnet 31 is disposed at the opposite side of the reflecting mirror 40 with respect to the Faraday rotator 20. The electromagnet 32 of this example is different from the electromagnet 32 shown in FIGS. 7 and 8, and is the electromagnet of an air-core coil structure without the core 32a.

The Faraday rotator 20 of the variable optical attenuator 3 according to this embodiment is also formed by polishing a garnet single crystal film grown by the LPE method. The garnet single crystal film has the vertical magnetic domain structure vertical to the film surface, and in the case where a magnetic field smaller than the saturation magnetic field is applied, since the Faraday rotator 20 has a magnetic domain structure, diffraction loss occurs.

In the variable optical attenuator 3 shown in FIG. 12, in the state where the magnetic field is applied to the Faraday rotator 20 by only the permanent magnets 30 and 31, the magnetic domain A occurring in the region where the magnetic field of the permanent magnet 30 is dominant is wider than the magnetic domain B occurring in the region where the magnetic field of the permanent magnet 31 is dominant. Therefore the light transmission region is completely contained in the region of the magnetic domain A. The saturation Faraday rotation angle is +θfs, and here, θfs is set to about 45°. The light emitted from the optical fiber 50 for input is converted into a parallel beam by the lens 42, and after passing through the birefringence wedge plate 14 and the Faraday rotator 20, the beam is reflected by the reflecting mirror 40, and again passes through the Faraday rotator 20 and the birefringence wedge plate 14, and is concentrated on the optical fiber 52 for output by the lens 42. Since the light passes through the Faraday rotator twice, the Faraday rotation angle becomes twice 45°, that is, 90°. The reflected light of light passing through the birefringence wedge plate as ordinary light again passes through the birefringence wedge plate as extraordinary light. On the other hand, the reflected light of light passing through the birefringence wedge plate as extraordinary light is again passes through the birefringence wedge plate as ordinary light. By adjusting the optic axis so that all such lights are incident on the optical fiber 52 for output, the light beam can be emitted from the input side optical fiber 50 to the output side optical fiber 52 without attenuation.

Next, power is applied to the electromagnet 32 to apply the magnetic field in the opposite direction to the direction of the magnetic field of the permanent magnet 30 and in the same direction as the direction of the magnetic field of the permanent magnet 31. The boundary region where the magnetic field in the vertical direction to the light entrance/exit plane becomes 0 is formed substantially at the center of the light transmission region. By this, the region of the magnetic domain A and the region of the magnetic domain B equally exist in the light transmission region on both sides of the magnetic domain wall I. The direction of the magnetization of the magnetic domain B is opposite to the direction of the magnetization of the magnetic domain A. Accordingly, the Faraday rotation angle of light passing through the magnetic domain A twice becomes +90°, and the Faraday rotation angle of light passing through the magnetic domain B twice becomes −90°. By this, since the phase of the light passing through the magnetic domain A twice is deviated from the phase of the light passing through the magnetic domain B twice by the half wavelength, the two lights concentrated on the end of the output optical fiber 52 cancel out. In the case where the region of the magnetic domain A and the region of the magnetic domain B equally exist in the light transmission region, the two lights concentrated on the end of the output optical fiber 52 are not coupled at all, and the maximum attenuation amount is obtained.

As stated above, similarly to the variable optical attenuator 2 shown in FIG. 8, the variable optical attenuator 3 of the structure shown in FIG. 12 is also characterized by using the polarizer, not using the change of the Faraday rotation angle. Since the variable optical attenuator 3 shown in FIG. 12 uses the polarizer, it is possible to obtain excellent characteristics of very small wavelength dependency and temperature dependency as compared with the conventional variable optical attenuator.

As described above, according to the embodiment, since the magnetic domain structure having no hysteresis and excellent in repetitive reproducibility is realized and the linear magnetic domain wall is stably moved, it is possible to realize the magneto-optic optical device which can be driven in low power consumption as compared with the related art. In the case where the polarizing axis relative angle is made 90°, it is possible to realize the magneto-optic optical device in which the wavelength dependency and temperature dependency are further suppressed.

Incidentally, as the magnetooptical crystal which can be used for the above embodiment, it is necessary to have an easy axis of magnetization in the direction vertical to the light entrance/exit plane. In the above embodiment, with respect to the external magnetic field, the component only in the vertical direction to the light entrance/exit plane has been argued, since in the magneto-optic optical device having such vertical magnetization characteristics, the magnetic field of the vertical direction component almost determines the magnetic domain structure. Although the magnetic field component in the in-plane direction exists, it has no large influence on the magnetic domain structure.

The invention is not limited to the above embodiment, but can be variously modified.

For example, in the above embodiment, as the magnetic field application mechanism for applying to the magnetooptical crystal the magnetic field component in the vertical direction to the light entrance/exit plane, one or two permanent magnets are used, however, the invention is not limited to this. For example, instead of the permanent magnet, an electromagnet may be naturally used for the magnetic field application mechanism.

As described above, according to the invention, by changing the magnetic domain structure in the light transmission region, a small, high speed, and low cost magneto-optic optical device can be realized.

What is claimed is:

1. A magneto-optic optical device, comprising:
   at least one magnetooptical crystal;
   a magnetic field application mechanism for applying to the magnetooptical crystal a magnetic field component in a direction vertical to a light entrance/exit plane; and
   at least one electromagnet for changing a position where the magnetic field component applied to the magnetooptical crystal becomes 0.

2. A magneto-optic optical device according to claim 1, wherein the magnetic field application mechanism includes at least one permanent magnet.

3. A magneto-optic optical device according to claim 1, wherein a magnitude of the magnetic field component is monotonously changed in a specified direction in the light entrance/exit plane.

4. A magneto-optic optical device according to claim 3, wherein the magnetooptical crystal includes a magnetic domain A constituted by a magnetization in a direction vertical to the light entrance/exit plane, and a magnetic domain B constituted by a magnetization in an opposite direction to the magnetization direction of the magnetic domain A.

5. A magneto-optic optical device according to claim 4, wherein the magnetic field generated by the electromagnet is changed to form a state where only the magnetic domain A exists in a light transmission region of the magnetooptical crystal and a state where both the magnetic domain A and the magnetic domain B are contained, and a transmitted light intensity is continuously changed.

6. A magneto-optic optical device according to claim 5, wherein a state where only the magnetic domain B exists is formed.

7. A magneto-optic optical device according to claim 5, wherein in the state where both the magnetic domain A and the magnetic domain B are contained, a boundary between the magnetic domain A and the magnetic domain B is almost linear.

8. A magneto-optic optical device according to claim 1, wherein a saturation Faraday rotation angle of the magnetooptical crystal is about 45°; and
   the magneto-optic optical device further comprising:
   a polarizer disposed at one side of the magnetooptical crystal; and
   an analyzer disposed at the opposite side of the magnetooptical crystal.

9. A magneto-optic optical device according to claim 1, wherein a saturation Faraday rotation angle of the magnetooptical crystal is about 90°; and
   the magneto-optic optical device further comprising:
   a polarizer disposed at one side of the magnetooptical crystal; and
   an analyzer disposed at the opposite side of the magnetooptical crystal.

10. A magneto-optic optical device according to claim 1, wherein a saturation Faraday rotation angle of the magnetooptical crystal is about 45°; and
    the magneto-optic optical device further comprising:
    a polarizer disposed at one side of the magnetooptical crystal; and
    a reflecting film disposed at the opposite side of the magnetooptical crystal.

11. A magneto-optic optical device according to claim 1, wherein the magneto-optic optical device is a variable optical attenuator for variably controlling an attenuation by changing a current applied to the electromagnet.

12. A magneto-optic optical device according to claim 1, wherein the magneto-optic optical device is an optical modulator for modulating a transmitted light intensity by modulating a current applied to the electromagnet.

13. A magneto-optic optical device according to claim 1, wherein the magneto-optic optical device is an optical switch.

* * * * *